United States Patent
Detlefs et al.

(10) Patent No.: US 7,272,695 B1
(45) Date of Patent: Sep. 18, 2007

(54) HOT-CARD CACHING TO AVOID EXCESSIVE REMEMBERED-SET UPDATING

(75) Inventors: David L. Detlefs, Westford, MA (US); Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 372 days.

(21) Appl. No.: 10/939,892

(22) Filed: Sep. 13, 2004

(51) Int. Cl. *G06F 12/00* (2006.01)
(52) U.S. Cl. .................. 711/170; 711/118; 711/159
(58) Field of Classification Search .............. 711/170
See application file for complete search history.

(56) References Cited

U.S. PATENT DOCUMENTS

| | | | |
|---|---|---|---|
| 5,920,876 A | 7/1999 | Ungar et al. | |
| 6,115,782 A | 9/2000 | Wolczko et al. | |
| 6,148,310 A | 11/2000 | Azagury et al. | |
| 6,173,294 B1 | 1/2001 | Azagury et al. | |
| 6,185,581 B1 | 2/2001 | Garthwaite | |
| 6,199,075 B1 * | 3/2001 | Ungar et al. ............... | 707/206 |
| 6,226,653 B1 | 5/2001 | Alpern et al. | |
| 6,243,720 B1 | 6/2001 | Munter et al. | |
| 6,308,185 B1 | 10/2001 | Grarup et al. | |
| 6,363,403 B1 | 3/2002 | Roy et al. | |
| 6,381,738 B1 | 4/2002 | Choi et al. | |
| 6,424,977 B1 | 7/2002 | Garthwaite | |
| 6,453,466 B1 | 9/2002 | Eidt | |
| 6,457,019 B1 | 9/2002 | Sexton et al. | |
| 6,490,599 B2 | 12/2002 | Kolodner et al. | |
| 6,826,757 B2 | 11/2004 | Steele et al. | |
| 6,845,437 B2 | 1/2005 | Borman et al. | |
| 6,868,488 B2 | 3/2005 | Garthwaite | |
| 2004/0003014 A1 | 1/2004 | Nagarajan et al. | |
| 2005/0235120 A1 * | 10/2005 | Dussud ....................... | 711/159 |

OTHER PUBLICATIONS

Appel, "Simple Generational Garbage Collection and Fast Allocation", Software Practice and Experience, 19(2), 1989, 171-183.
Appel, et al., "Real-Time Concurrent Collection on Stock Multiprocessors", ACM SIGPLAN Notices, 1988.
Bacon, et al., "Java without the Coffee Breaks: A nonintrusive Multiprocessor Garbage Collector", SIGPLAN Conference on Programming Language Design and Implementation, Jun. 2001, Snowbird, UT.

(Continued)

*Primary Examiner*—Reginald Bragdon
*Assistant Examiner*—Aracelis Ruiz
(74) *Attorney, Agent, or Firm*—Osha Liang LLP (57) ABSTRACT

An incremental collector that employs remembered sets to identify the locations where a mutator has modified references to objects in respective heap regions employs a thread operating concurrently with the mutator to update the remembered sets in accordance with reference mutation. Specifically, when the mutator modifies a reference in one of a plurality of "cards" into which the collector treats the heap as divided, the concurrent thread ordinarily searches the card for references in accordance with which it updates the remembered set. But it selects certain cards, in which it has observed particularly high mutation activity, as ones in which reference mutation will not cause concurrent remembered-set updating. Remembered-set updating in response to those cards' references occurs only when all mutator threads have been suspended.

18 Claims, 7 Drawing Sheets

OTHER PUBLICATIONS

Baker, "List Processing in Real Time on a Serial Computer", Communications of the ACM 21, Apr. 1978, 280-294.

Brooks, "Trading Data Space for Reduced Time and Code Space in Real-Time Garbage Collection on Stock Hardware", Proceedings of the 1984 Acm Symposium on Lisp and Funcional Programming, Aug. 1984, 108-113, Austin, TX.

Chilimbi, et al., "Using Generational Garbage Collection to Implement Cache-Conscious Data Placement", International Symposium on Memory Management, Oct. 1998.

Clark, et al., "Compacting Garbage Collection can be Fast and Simple", Software-Practice and Experience, vol. 26, No. 2, Feb. 1996, 177-194.

Courts, "Improving Locality of Reference in a Garbage-Collecting Memory Management System", Communications of the ACM, vol. 31, No. 9, Sep. 1988, 1128-1138.

Grarup, et al., "Incremental Mature Garbage Collection", M.Sc. Thesis @ http://www.daimi.aau.dk/jacobse/Papers, Aug. 1993.

Herlihy, et al., "Lock-Free Garbage Collection for Multiprocessors", ACM SPAA, 1991, 229-236.

Holzle, Urs, "A Fast Write Barrier for Generational Garbage Collectors", Workshop on Garbage Collection in Object Oriented Systems, Oct. 1993.

Hosking, et al., "Remembered Sets Can Also Play Cards", OOPSLA/ECOOP Workshop on Garbage Collection in Object-Oriented Systems, Oct. 1993.

Hosking, et al., "Protection Traps and Alternatives for Memory Management of an Object-Oriented Language", Object Systems Laboratory, Dec. 1993, 1-14, Dept. of Comp. Sci., Amherst, MA.

Hudson, et al., "Incremental Collection of Mature Objects", Proceedings of the Int'l Workshop on Memory Managment, 1992, pp. 1-16, Springer-Verlag.

Hudson, et al., "Adaptive Garbage Collection for Modula-3 and Small Talk", OOPSLA.ECOOP '90 Workshop on Garbage Collection in Object-Oriented Systems, Oct. 27, 1990.

Hudson, et al., "Sapphire: Copying GC Without Stopping the World", Java Grande/ISCOPE, 2001.

Jones and Lins, "Garbage Collection: Algorithms for Automatic Dynamic Memory Management", 1996, 165-179, John Wiley and Sons, NY.

Leiberman, et al., "A Real-Time Garbage Collector Based on the Lifetimes of Objects", Communications of the ACM, 1983, 26(6).

Moon, "Garbage Collection in a Large Lisp System", Conference Record of the 1984 ACM Symposium on LISP and Functional Programming, Aug. 1984, 235-246, Austin, TX.

Nettles, Scott, "Real-Time Replication Garbage Collection", Avionics Lab, Wright Research and Development Center, 1993, PDDI.

Seligmann, et al., "Incremental Mature Garbage Collection, In the European Conference on Object-Oriented Programming", M.Sc. Thesis @ http://www.daimi.aau.dk/jacobse/Papers/, 1995.

Sobalvarro, "A Lifetime-based Garbage Collector for LISP Systems on General-Purpose Computers", Department of Electrical Engineering and Computer Science at MIT, Sep. 1988, AITR-1417.

Stamos, "Static Grouping of Small Objects to Enhance Performance of a Paged Virtual Memory", ACM Transactions on Computer Systems, vol. 2, No. 2, May 1984, 155-180.

Ungar, "Generation Scavenging: A Non-Disruptive High Performance Storage Reclaration Algorithm", ACM SIGPLAN Notices, Apr. 1984, 19(5).

Wilson, "Uniprocessor Garbage Collection Techniques", Technical Report, University of Texas, 1994.

Withington, P.T., "How Real is "Real-Time" GC?", Symbolics, Inc., Oct. 6, 1991, Burlington, MA.

Zorn, Benjamin, "Barrier Methods for Garbage Collection", Dept. of Computer Science, Uni. of Colorado, Nov. 1990, 1-37, Boulder.

Hosking, et al., "A Comparative Performance Evaluation of Write Barrier Implementations", OOPSLA; ACM Conference on Object-Oriented Systems, Languages and Applications, Oct. 1992, V. 27(10), ACM Press, Vancouver, Canada.

Lam, et al., "Object Type Directed Garbage Collection to Improve Locality", Proceedings of the International Workshop on Memory Management, Sep. 1992, 404-425, St. Malo, France.

Pirinen, Pekka, "Barrier Techniques for Incremental Tracing", Harlequin Limited, Date Unknown, 20-25, Cambridge, Great Britain.

Wilson, et al., "Effective Static-Graph Reorganization to Improve Locality in Garbage Collected Systems", Proceedings of ACM SIGPLAN Conference on Programming Language Design and Implementation, Jun. 1991, Canada.

Detlefs, et al., "Concurrent Remembered Set Refinement in Generational Garbage Collection", Proceedings of the USENIX Java VM '02 Conference, Aug. 1-2, 2002, 14 pages, San Francisco, CA, USA.

* cited by examiner

HOT-CARD CACHING TO AVOID EXCESSIVE REMEMBERED-SET UPDATING

BACKGROUND OF THE INVENTION

1. Field of the Invention

The present invention concerns computer-program compiling and in particular to what has in that discipline come to be referred to as "garbage collection."

2. Background Information

Garbage collection is the term that has come to be used for the operations by which data objects that a program will no longer use are recognized so that the computer memory occupied by those objects can be reclaimed for reuse. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. An object also may belong to a class, which is an organizational entity that may contain method code or other information shared by all objects belonging to that class. In the discussion that follows, though, the term object will not be limited to such structures; it will additionally include structures with which methods and classes are not associated.

Garbage collection is used almost exclusively in environments in which memory can be allocated to some objects dynamically. Not all systems employ dynamic allocation. In some computer languages, source programs must be se written so that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data that a microprocessor 11 uses and instructions for operating on them may reside in onboard cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Figure 1:
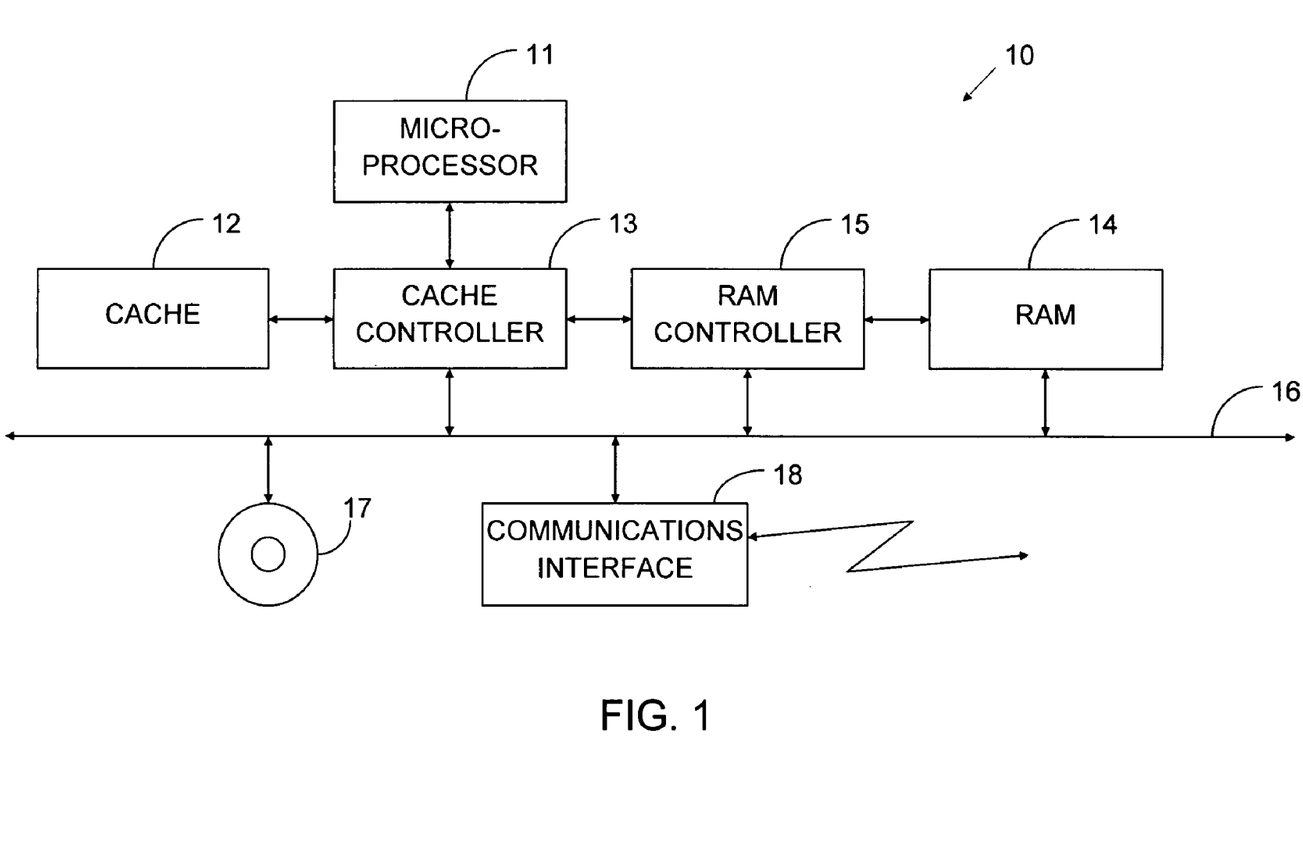
FIG. 1, discussed above, is a block diagram that illustrates a typical computer system in which the present invention's teachings may be practiced.

Additionally, the actual physical operations performed to access some of the most-recently visited parts of the process's address space often will actually be performed in the cache 12 or in a cache on board microprocessor 11 rather than on the RAM 14. Those caches would swap data and instructions with the RAM 14 just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Some computer systems may employ a plurality of processors so that different processes' executions actually do occur simultaneously. Such systems come in a wide variety of configurations. Some may be largely the same as that of FIG. 1 with the exception that they include more than one microprocessor such as processor 11, possibly together with respective cache memories, sharing common read/write memory by communication over the common bus 16.

In other configurations, parts of the shared memory may be more local to one or more processors than to others. In such a situation, one or the other or both of the processors may need to fetch code or data or both from a remote location, but it will often be true that parts of the code will be replicated in both places.

Despite these expedients, the use of static memory allocation in writing certain long-lived applications makes it difficult to restrict storage requirements to the available memory space. Abiding by space limitations is easier when the platform provides for dynamic memory allocation, i.e., when the platform enables allocation of memory space to be delayed until after the program has been loaded and is already running.

Dynamic allocation has a number of advantages, among which is that the run-time system is able to adapt allocation to run-time conditions; for given objects the programmer can specify respective conditions on which space should be allocated to them. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak." Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicitly managing dynamic memory by using interfaces like malloc( )/free( ) often leads to these problems.

Such leaks and related errors can be made less likely by reclaiming memory space more automatically. As was mentioned above, the software and/or hardware used for this purpose is typically referred to as a garbage collector. Garbage collectors operate by inspecting the running program's current state, determining from that state whether it can decide that there are some objects that the program can no longer reach, and reclaiming objects thus found not to be reachable. The criteria that garbage collectors use for this purpose vary, but, for example, a program's global variables are normally considered reachable throughout a program's life. Although they are not ordinarily stored in the memory space that the garbage collector manages, they may contain references to dynamically allocated objects that are, and the garbage collector will consider such objects reachable. It will typically also consider an object reachable if it is referred to by a reference in a register or a thread's call stack. And reachability is contagious: if a reachable object refers to another object, that other object is reachable, too.

It is advantageous to use garbage collectors because, whereas a programmer working on a particular sequence of code can perform his task creditably in most respects with only local knowledge of the application, memory allocation and reclamation tend to require more-global knowledge. A programmer dealing with a small subroutine, for example, may well be able to identify the point in the subroutine beyond which the routine has finished with a given memory portion, but knowing whether the application as a whole will be finished with it at that point is often much more difficult. In contrast, garbage collectors typically work by tracing references from some conservative notion of a "root set," e.g., global variables, registers, and the call stack: they thereby obtain reachability information methodically. By using a garbage collector, the programmer is relieved of the need to worry about the application's global state and can concentrate on (more-manageable) local-state issues. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that typically carry the digital data by which the computer systems exchange that code are examples of the kinds of electromagnetic signals by which the computer instructions can be communicated. Others are radio waves, microwaves, and both visible and invisible light.

Figure 2:
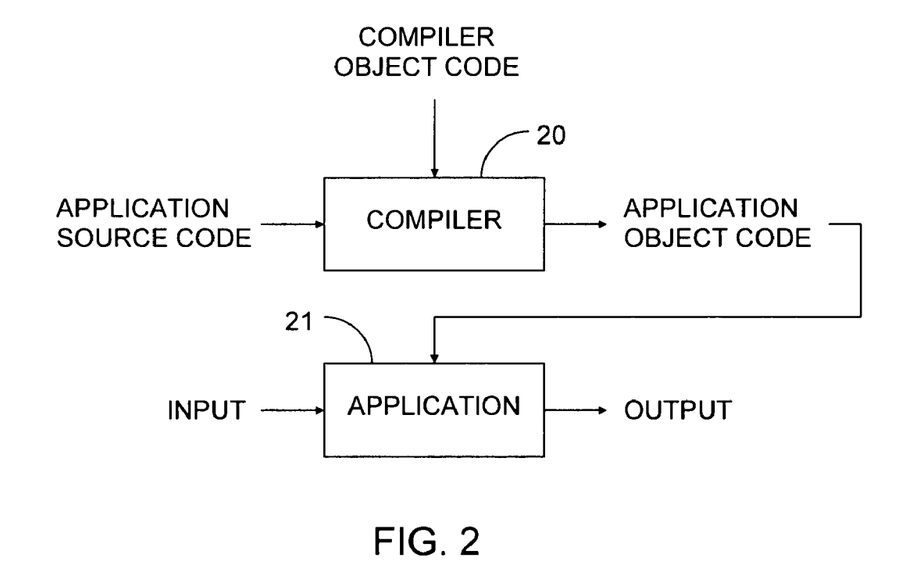
FIG. 2, discussed above, is a block diagram that illustrates the relationship between a compiler and the resultant application program.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of hardware that lends itself particularly to use in garbage collection. So even a very simple system may disperse the garbage-collection mechanism over a number of computer-system layers.

Figure 3:
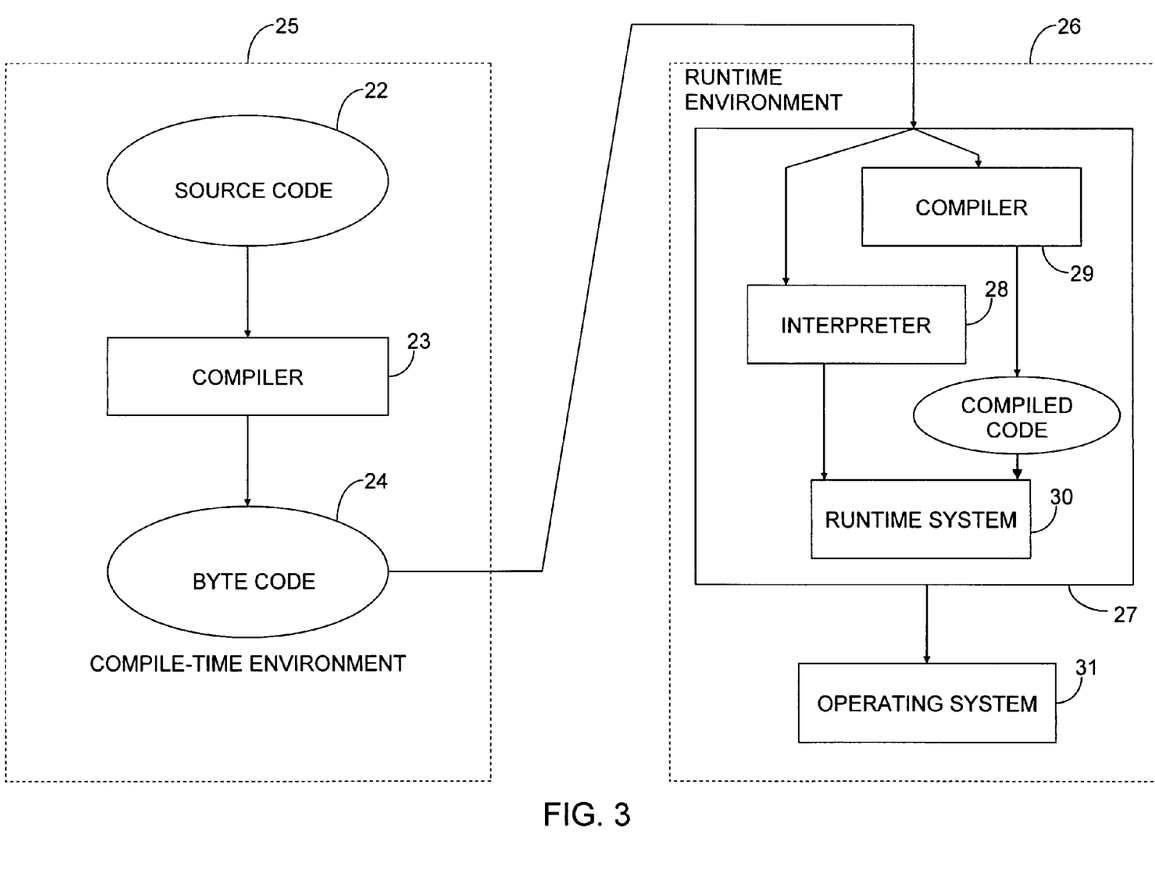
FIG. 3, discussed above, is a block diagram that illustrates another way in which source code can result in an executing program.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte code" 24, for a "virtual machine" that various processors can be software-configured to emulate. This conversion into byte code is almost always separated in time from that code's execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte code is drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted by electromagnetic signals to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29.

The resultant instructions typically invoke calls to a run-time system 30, which handles matters such as loading new class files as they are needed and includes much of garbage-collector implementation. The run-time system will typically call on the services of an underlying operating system 31. Among the differences between the arrangements of FIGS. 2 and 3 in that FIG. 3's compiler 23 for converting the human programmer's code does not contribute to providing the garbage-collection function; that results largely from the virtual machine 27's operation.

Independently of the specific system-architecture levels at which the collector resides, garbage collection usually includes some amount of reference tracing to determine whether objects are at least potentially reachable; if they are not potentially reachable, they are garbage, and their memory space can therefore be reclaimed. The most straightforward and accurate way to do the tracing is to start at the root set and scan recursively for referred-to objects until all have been identified. If an object is not encountered in that process, it is not reachable, even if it is referred to by a reference in some other object.

Now, it would be unacceptable in many applications to have the mutator pause while the collector traces references through the whole heap. So some garbage collectors operate "space-incrementally." In each successive collection increment, which typically (but not necessarily) is all performed during a single pause in mutator execution, the collector considers a small portion, or collection set, of the heap. For respective regions of the heap into which the collector treats the heap as divided, the collector keeps track of the references that refer directly to objects in those regions. A collection-set object can be recognized as unreachable if no reference chain from such a reference includes it. This approach can often limit the lengths of collection pauses adequately.

Even in space-incremental approaches, though, it is desirable to reduce collection-pause lengths as much as possible, and one way of doing so involves the way in which the system updates "remembered sets." For each of a number of heap regions, the system keeps a so-called remembered set of the locations where references to objects in those regions have been observed. To enable the collector to keep remembered sets complete, mutators written for use with space-incremental collectors typically include so-called write barriers. A write barrier is code added to a reference-writing operation to notify the collector of that operation. Write barriers of the type relevant here do so by recording information from which the collector can determine where references were written, although they may additionally record other types of information about the operation, such as the reference value written or replaced. Before it uses the remembered sets to determine collection-set objects' potential reachability, the collector typically updates them, and in doing so it can limit its attention to locations identified by the write barriers as possibly modified since the last collection interval.

Figure 4:
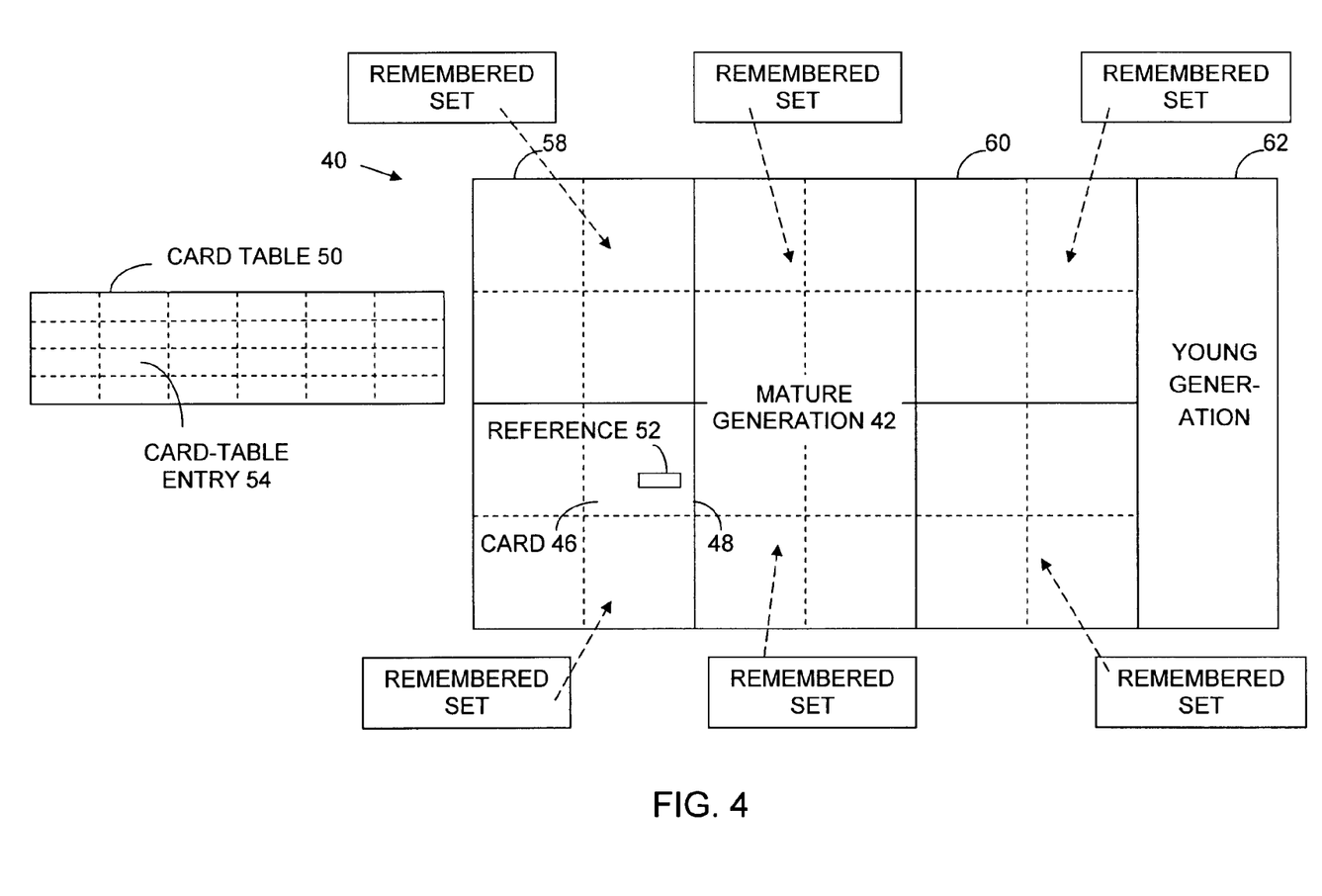
FIG. 4, discussed above, is a block diagram that illustrates card-table operation.

To this end, the write barrier can simply add to a list, commonly called a sequential-store buffer, of locations where reference mutation has occurred. An alternative, which FIG. 4 illustrates, is for the write barrier instead to employ what is often referred to as a "card table." FIG. 4 depicts a garbage-collected heap 40. Of that heap a portion 42, which for reasons that will become apparent will be referred to as the "mature generation," is shown as divided into sections known for this purpose as "cards" such as card 46. Card size is a design choice, but it is usually such that a plurality fit into each region, such as region 48, with which a separate remembered set is associated. The collector maintains a card table 50 containing an entry for each card. When the mutator writes a reference, such as reference 52 in card 46, it makes the entry 54 associated with that card (or, say, with the card in which the object containing the reference begins) indicate that the card is "dirty," i.e., that the card has had one or more of its references modified.

As was stated above, a collector updating remembered sets can restrict its attention to references located in dirty cards. Some collectors use this approach uniformly. To indicate that not all do, though, FIG. 4 shows only the mature generation as divided into cards. A typical approach to garbage collection is to place most newly allocated objects in a small heap portion, or "young generation." Since newly allocated objects have a greater tendency to become unreachable than objects that have already remained reachable for some time, the collector collects the young generation frequently, and it copies ("promotes") objects into the mature generation when they have survived a certain number of young-generation collections. In the common arrangement in which the collector collects the entire young generation just before every increment of mature-generation collection, it does not need write-barrier results to find references in the young generation, because that part of the heap is being completely scanned as part of the young-generation collection operation. Also, although the collector does need to keep track of references in the rest of the heap that refer to young-generation objects in the young generation, it may for that purpose employ a type of remembered set for the young generation that differs from the type it uses for mature-generation references to mature-generation objects.

In any event, even though the collector restricts its attention to references located in dirty cards, the amount of time required to update remembered sets can be significant. So, to limit the portion of the collection-pause length taken up by updating, some collectors employ one or more remembered-set-updating threads that execute concurrently with the mutator. Usually, some remembered-set-updating activity remains to be done when the collection pause occurs, but much of it will typically have been performed already, concurrently with the mutator's execution, so the pause's duration is less than it would have been without the concurrent remembered-set-updating.

Although concurrent remembered-set-updating thus reduces the remembered-set-updating portion of a pause's duration, it nonetheless exacts its own cost. If the same reference is modified more than once between collection pauses, for example, the number of times the remembered set needs to be updated in response to a given reference location is greater than it would be if updating were limited to collection pauses. Moreover, the resultant remembered-set size can be greater, so the time required to scan the thereby-listed locations for references to collection-set objects can be greater.

SUMMARY OF THE INVENTION

We have developed a way of reducing this undesirable effect. In particular, we maintain for each card listed as dirty some indication of how much reference-mutation activity has occurred in that card. On the basis of these "mutation-count" values, we select certain cards as "hot cards." (We refer to the thus-selected segments as "hot cards" even when the write-barrier technique does not employ a card table. For example, the locations listed in a sequential-store buffer can be considered "cards" for this purpose.)

When the concurrently executing remembered-set-updating thread encounters a dirty card, which it would otherwise process to update a remembered set, it refrains from doing so if the card is a hot card. If the criterion for selecting hot cards is, for example, that the number of times they have been processed for remembered-set updating exceeds a threshold, then the collector can obtain most of the benefits of concurrent remembered-set updating while avoiding to a significant degree the attendant disadvantages.

BRIEF DESCRIPTION OF THE DRAWINGS

The invention description below refers to the accompanying drawings, of which.

DETAILED DESCRIPTION OF AN ILLUSTRATIVE EMBODIMENT

As is mentioned above, a mutator with which a space-incremental collector is employed records its reference updates by, for instance, placing a dirty-indicating mark in the card-table entry associated with the card to which the reference "belongs." (In some versions, the reference belongs to a card if it is located in that card. In others, it belongs to a card if it is part of an object whose starting address is located in the card.) For present purposes, we will assume that the write barrier employs the card-table approach, although the present invention's teachings can be employed with other write-barrier approaches.

Figure 5:
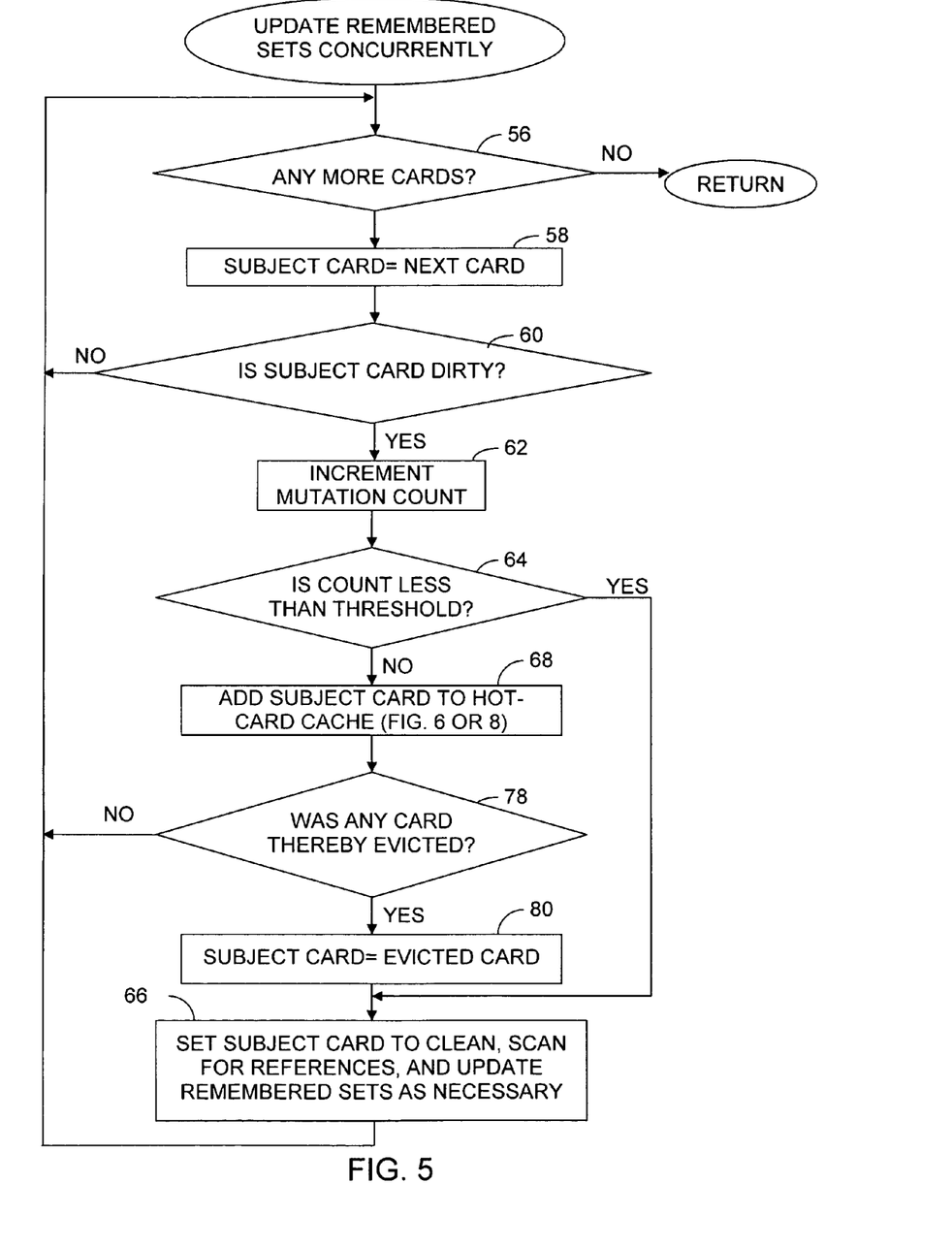
FIG. 5 is a flow chart that illustrates concurrent remembered-set updating.

Concurrently with the mutator's operation, one or more (but typically one) collector thread operates in a manner similar to the one that FIG. 5 depicts. When some appropriate triggering event occurs, the thread will begin executing, and it steps through the card table, as blocks 56 and 58 indicate, until it has considered all cards. (Alternatively, the thread could simply cycle endlessly through the card table.)

The concurrently executing remembered-set-updating thread inspects each table entry, as block 60 indicates, to determine whether the corresponding card is dirty, and then proceeds to the next card if it is not. If the current card is dirty, though, that thread proceeds with operations that it uses in support of its selection of cards to which, for reasons that will become apparent we will here refer to as "hot" cards. To this end, the illustrated embodiment maintains a table, to which we will here refer as the "count table," that is separate from the card table in the illustrated embodiment but does not need to be to implement the present invention's teachings. Like the card table, the count table includes an entry for each card, but the card entries in this case represent the number of times the collector has scanned that card in order to update the remembered sets. (Other embodiments may employ other indicators of the reference-mutation frequency in a card, but we prefer this approach.)

Block 62 represents incrementing the count for the card in question, and block 64 represents then determining whether the count has reached a "hotness" threshold. If it has not, the card's card-table entry is given a clean-indicating value, and the card is scanned for references, as block 66 indicates. Each time the thread encounters a reference in the dirty card, it updates the remembered set associated with the heap region to which the object thereby referred belongs if that region is not the one that contains the reference itself but is one for which the collector maintains a remembered set. Often the remembered set is implemented as a hash table so that the collector can determine rapidly whether the remembered set already contains an identifier of the reference's location and can thereby refrain from adding a duplicate.

If the block-64 operation instead determines that the count has reached the threshold, the collector thread selects that card as a hot card: it refrains from scanning it. As block 68 indicates, it instead places an identifier of that card into what we will refer to as a "hot-card cache."

Figure 6:
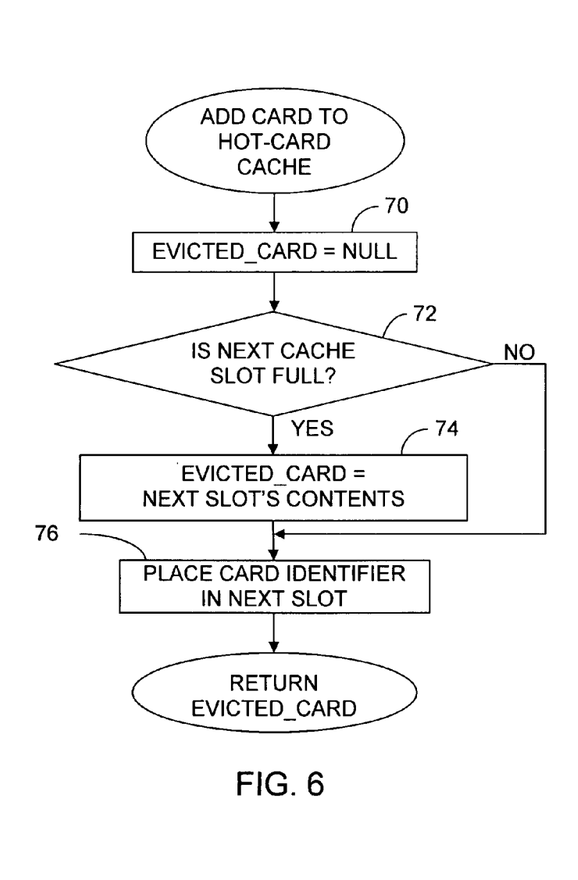
FIG. 6 is a flow chart of a routine for inserting a card identifier into a hot-card cache.

One way of implementing the hot-card cache is as a fixed-size circular queue to which the additions represented by FIG. 5's block 68 are performed in a manner that FIG. 6 depicts. A circular queue is usually implemented as an array of slots with which top- and bottom-indicating pointers are employed. The bottom-indicating pointer identifies the slot where the next entry should be added. When an entry is thereby added to the end of the array, the bottom-indicating pointer is changed to designate the slot at the start of the array: the insertion sequence is circular. The location identified by the top-indicating pointer advances similarly as entries are removed. When the bottom reaches the top, the circular queue is full.

For purposes of explanation, FIG. 6 depicts the card-insertion routine as beginning by initializing an "evicted_card" pointer to a NULL value, in an operation that block 70 represents. Block 72 represents determining whether the circular queue is full. If it is, then the collector employs evicted_card to remember the next slot's current contents, as block 74 indicates. In any case, the collector then writes into that slot, as block 76 indicates, an identifier of the card newly identified as hot, thereby "evicting" the previous occupant if there was one, and the routine returns the identity of any card thereby evicted.

As FIG. 5's block 78 indicates, what the thread does next depends on whether a card eviction occurred. If none did, the thread simply proceeds to the card table's next entry. Otherwise, it treats the evicted card as no longer hot: it updates remembered sets in response to that card's references, as blocks 80 and 66 indicate.

The concurrent remembered-set-updating thread operates continually or repeatedly while the mutator is operating. At some point, though, the collector will need to perform copying collection or some other operation that requires one or more remembered sets to be complete, and all mutator threads are suspended for this purpose.

Figure 7:
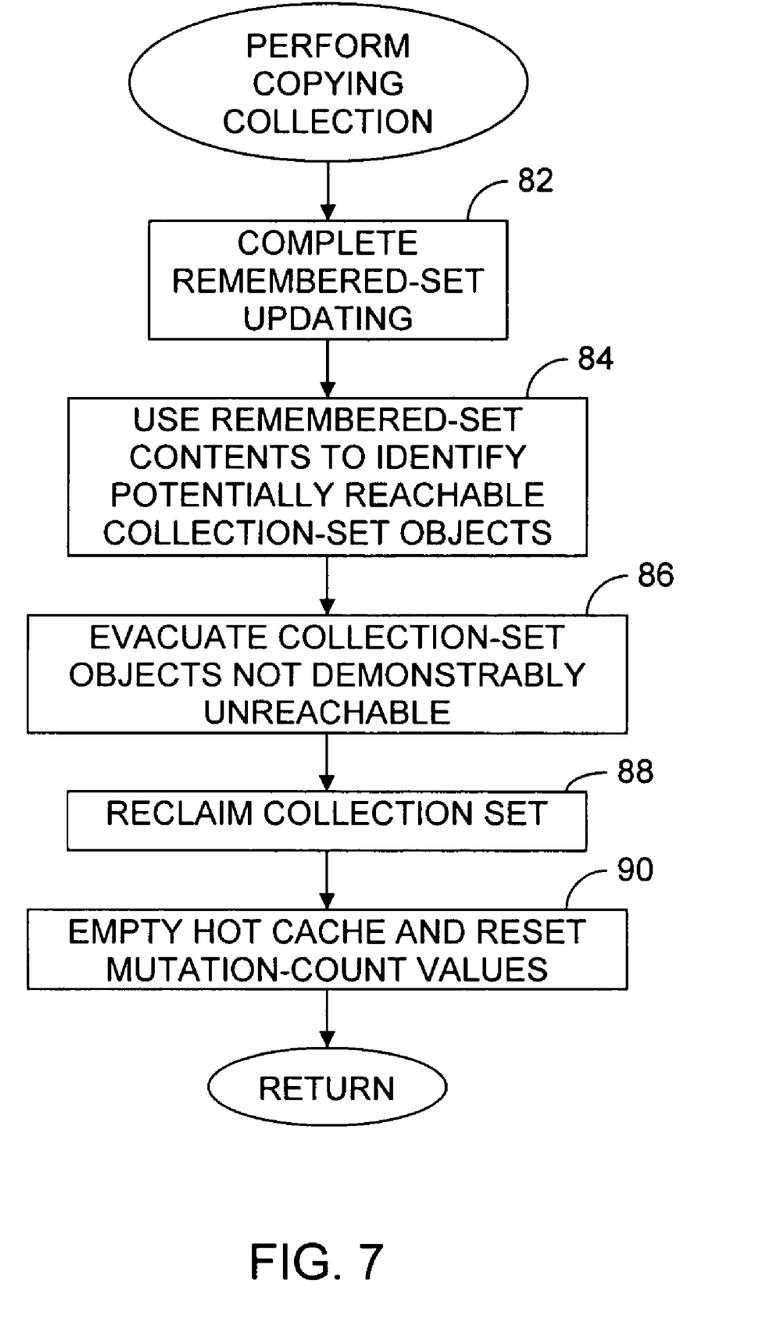
FIG. 7 is a flow chart of a copying-collection increment.

FIG. 7 depicts a copying-collection interval in simplified form. At the beginning of the interval, some remembered-set updating will often remain to be done, as block 82 indicates. This is true particularly if there have been hot cards, since, as was just explained, the collector will have refrained from remembered-set updating in response to reference mutation in such cards.

In cases in which the same reference was modified a large number of times between collection intervals, a large number of updating operations on that reference card might have been required in the absence of the present invention's technique of refraining from a concurrent updating in response to reference mutations in hot cards. In accordance with the present invention, on the other hand, that expense will often largely be avoided; so long as the collector considers a card a hot card, no reference in that card will be processed until an interval, such as a copying-collection interval, in which remembered sets will be used to determine potential reachability.

As block 84 indicates, the collector will employ the updated remembered set or sets associated with collection-set regions to identify objects that are potentially reachable; if a reference located outside the collection set points directly to an object located in the collection set, then the object is potentially reachable. Any object not thus identified as potentially reachable—or reachable from some other object identified as potentially reachable—it is demonstrably unreachable. Some collectors additionally employ other mechanisms for demonstrating that collection-set objects are unreachable. If a collection-set object has not thus been demonstrated by any such mechanism to be unreachable, it is considered potentially reachable, so the collector evacuates it from the collection set, as block 86 indicates. As block 88 indicates, it then reclaims the collection set, from which all objects that are not demonstrably unreachable have been evacuated. As block 90 indicates, the illustrated embodiment then empties the hot cache and resets all cards' mutation-count values.

There may be some embodiments that do not thus clear the hot-card cache and reset the mutation count during every collection increment. The reason may be to remember from one inter-increment interval to another which cards tend to be the sites of frequent reference mutation. For instance, the count could be maintained as an exponential average of the counts for individual inter-collection-pause intervals. Or the count could be reset on some collection increments but not on others. In some generational collectors, for example, some, "minor" collection pauses involve collecting only the young generation, while other, "major" collection pauses involve collecting both the young generation and a portion of the old generation, and some embodiments may reset the count values only in major collection pauses. But we prefer the frequent information updating in which block 82's emptying and resetting in every collection increment results.

Now, a review of FIG. 7 reveals that remembered-set updating will tend to be time-consuming if the number of hot cards is large. Of course, if the number of hot cards is large, then the concurrent collector has presumably avoided a significant amount of repeated processing and possibly kept the remembered sets smaller than they otherwise would be. But limiting the lengths of collection pauses is usually a paramount consideration, so most embodiments will, as the illustrated one does, impose an upper limit on the hot-card-cache size.

Figure 8:
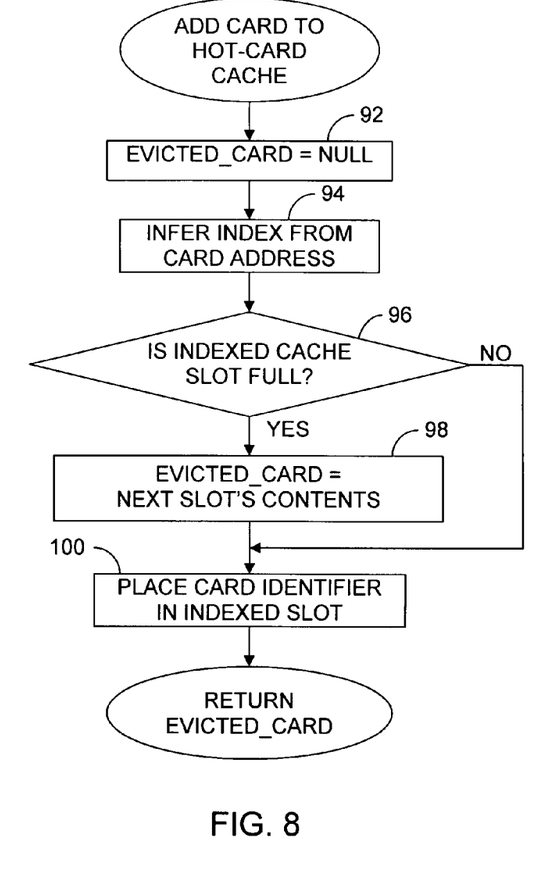
FIG. 8 is a flow chart of another routine for inserting a card identifier into a hot-card cache.

But limiting the size of the hot-card set is not a requirement. Even for the embodiments that do impose such a requirement, moreover, the illustrated, circular-queue arrangement is not necessary. For example, some embodiments may instead implement the cache as a direct-mapped cache to which insertions are performed in accordance with the FIG. 8 routine. As FIG. 8 reveals, the routine there depicted is similar to that of FIG. 6; its block 92, for example, represents the conceptual initializing operation that FIG. 6's block 70 does. But the routine of FIG. 8 additionally includes the block-94 operation of inferring a table index from the card's address. For example, the index may be the result of applying a hash function to that address. As block 96 indicates, the collector then determines whether the cache slot thereby identified already contains a card identifier. If it does, then the collector employs evicted_card to remember the next slot's current contents, as block 98 indicates. In any case, the collector then places into that slot, as block 100 indicates, an identifier of the card newly identified as hot. The routine then returns the identity of any card thereby evicted.

The different hot-card-cache implementations have respective advantages. The direct-mapped cache can be advantageous when there are a lot of evictions and some of the cards evicted encounter much more mutation activity than others. For example, assume that, although card A's mutation activity is great enough to cause it to be selected as a hot card, card B's mutation rate is ten times card A's. If card B is inserted into a circular buffer of capacity N, it will be evicted when N other cards have been inserted. So it will get processed again every N insertions. The same is true of card A, despite the disparity in their actual mutation rates. In the direct-mapped-cache case, on the other hand, card B may have its own slot, in which case it would, desirably, avoid eviction. In a situation in which a lot of evictions occur, of course, it is more likely that card B will conflict with some other hot card, so it will be evicted—and processed. If we assume that card A is the card with which it conflicts, though, the direct-mapped cache still yields an advantage; since card B is actually subject to much more mutation than card A, it will be re-inserted soon after if it is evicted, whereas, after card A is thereby evicted, it will probably take longer before a mutation reinserts it and displaces card B. So card B may spend more time in the cache than card A—and get processed less often that it would if the circular cache were being used.

On the other hand, use of a direct-mapped cache can also result in conflict between two cards whose mutation rates are both high. In such a case, each card's insertions into the cache will cause the other card to be processed frequently, and the result will be inferior to that of the circular-cache approach. To achieve a rate of card processing lower than that of either of those approaches, some embodiments may instead employ a priority queue, i.e., a queue from which the collector always evicts the card whose mutation count is lowest.

For the sake of explanation, the invention has been described in terms of a particularly simple embodiment, but those skilled in the art will recognize that the present invention's teachings can be employed in arrangements that differ significantly from the one just described. For one thing, the division of labor between the mutator and the concurrently operating remembered-set-updating thread can differ from the one just described. For example, although the remembered-set-updating thread is described as searching through the card table, a better approach may be for the mutator's write barrier not only to write a dirty-indicating value as the appropriate card-table entry but also to add an identifier of that entry into a log, i.e., into a list of cards that the mutator has dirtied. The remembered-set-updating thread can then concentrate on those logged locations and thereby avoid having to inspect the card-table entries that do not have dirty-indicating values.

In the case of a potentially multiply-threaded mutator, an advantageous way of implementing such a log is for each mutator thread to have its own separate "log buffer." If the thread fills its local log buffer, it adds that buffer to a global set of completed buffers and then allocates or otherwise adopts a new, empty buffer as its local log buffer. This tends to minimize contention for making log entries. Additionally, it provides a convenient mechanism for determining when to trigger operation of the remembered-set-updating thread. Specifically, if the number of completed buffers reaches some threshold, the mutator can trigger the concurrent thread's operation, and that thread's operation will continue until it has completed processing all of the buffers in the global set. In this case, the collector thread would simply step through the global set of completed blocks rather than traverse the entire card table. The card table would remain useful, though, because it provides a mechanism for minimizing duplication of log-buffer entries.

In some embodiments, the mutator may go even further in the extent to which it helps the collector keep remembered sets updated. Suppose that reference mutation occurs at such a pace that the concurrent collector thread is unable to reduce the size of the global completed-buffer set, i.e., that the concurrent remembered-set-updating thread cannot keep up with the rate of reference mutation. The mutator's write barrier could detect this as an excessively high value in the number of completed buffers. In response to observing such a large set of global buffers, the mutator's write barrier could divert the mutator thread to processing some of the cards represented by the global set's log buffers. Synchronization issues raised by thus dividing that processing can be handled by one of the standard techniques—or ignored. For example, incrementing a card's mutation count could be performed in an operation in which writing the incremented value is performed atomically with reading the mutation-count value to be incremented. But, since the mutation count does not have to be perfectly accurate, some embodiments may avoid the cost of performing those steps atomically.

In short, the present invention can be implemented in a wide range of embodiments and therefore constitutes a significant advance in the art.

What is claimed is:

1. A method of employing a computer system to execute a program including a mutator that allocates objects dynamically in a heap and a garbage collector that collects at least a portion of the heap in space increments, in each of a plurality of which it bases collection of a respective collection set that includes one or more heap regions for each of which it maintains a respective remembered set that indicates where the mutator has written references to objects belonging to that heap region, the method comprising:
   A) maintaining, for each of a plurality of cards into which the heap is treated as being divided, a count value indicative of how much mutation has occurred in that card;
   B) on the basis of the count values, selecting cards for membership in a hot-card set;
   C) concurrently with mutator operation, updating remembered sets in response to mutations of references belonging to some cards without concurrently updating any remembered set in response to any mutation of a reference belonging to a card that is a member of the hot-card set; and
   D) before performing a collection based on a remembered set, updating that remembered set in accordance with mutations of references belonging to cards in the hot-card set.

2. A method as defined in claim 1 wherein:
   A) when the mutator modifies a reference, the mutator marks as modified the card to which that object belongs; and
   B) the remembered-set updating includes:
      i) scanning cards thus marked for references to objects in heap regions and recording such references' locations in the remembered sets associated with those heap regions; and
      ii) incrementing the count value for each card thus scanned.

3. A method as defined in claim 2 wherein the count value is reset to zero when at least some collection increments occur.

4. A method as defined in claim 1 wherein the hot-card set's size is limited to predetermined maximum set size.

5. A method as defined in claim 4 wherein a card becomes a member of the hot-card set whenever its count value reaches a predetermined threshold count value if the hot-card set's size has not reached the predetermined set size.

6. A method as defined in claim 5 wherein, when the hot-card set's size has reached the predetermined set size and a card's count value reaches a predetermined threshold count value, that card becomes a member of the hot-card set and another card is removed from the hot-card set.

7. A computer system configured to execute a program including a mutator that allocates objects dynamically in a heap and a garbage collector that collects at least a portion of the heap in space increments, in each of a plurality of which it bases collection of a respective collection set that includes one or more heap regions for each of which it maintains a respective remembered set that indicates where the mutator has written references to objects belonging to that heap region, wherein the computer system so executes the program as to:
   A) maintain, for each of a plurality of cards into which the heap is treated as being divided, a count value indicative of how much mutation has occurred in that card;
   B) on the basis of the count values, select cards for membership in a hot-card set;
   C) concurrently with mutator operation, update remembered sets in response to mutations of references belonging to some cards without concurrently updating any remembered set in response to any mutation of a reference belonging to a card that is a member of the hot-card set; and
   D) before performing a collection based on a remembered set, update that remembered set in accordance with mutations of references belonging to cards in the hot-card set.

8. A computer system as defined in claim 7 wherein:
   A) when the mutator modifies a reference, the mutator marks as modified the card to which that object belongs; and
   B) the remembered-set updating includes:
      i) scanning cards thus marked for references to objects in heap regions and recording such references' locations in the remembered sets associated with those heap regions; and
      ii) incrementing the count value for each card thus scanned.

9. A computer system as defined in claim 8 wherein the count value is reset to zero when at least some collection increments occur.

10. A computer system as defined in claim 7 wherein the hot-card set's size is limited to a predetermined maximum set size.

11. A computer system as defined in claim 10 wherein a card becomes a member of the hot-card set whenever its count value reaches a predetermined threshold count value if the hot-card set's size has not reached the predetermined set size.

12. A computer system as defined in claim 11 wherein, when the hot-card set's size has reached the predetermined set size and a card's count value reaches a predetermined threshold count value, the card becomes a member of the hot-card set and another card is removed from the hot-card set.

13. A storage medium containing instructions readable by a computer system to execute a program including a mutator that allocates objects dynamically in a heap and a garbage collector that collects at least a portion of the heap in space increments, in each of a plurality of which it bases collection of a respective collection set that includes one or more heap regions for each of which it maintains a respective remembered set that indicates where the mutator has written references to objects belonging to that heap region, wherein the instructions configure the computer system to:

A) maintain, for each of a plurality of cards into which the heap is treated as being divided, a count value indicative of how much mutation has occurred in that card;

B) on the basis of the count values, select cards for membership in a hot-card set;

C) concurrently with mutator operation, update remembered sets in response to mutations of references belonging to some cards without concurrently updating any remembered set in response to any mutation of a reference belonging to a card that is a member of the hot-card set; and D) before performing a collection based on a remembered set, update that remembered set in accordance with mutations of references belonging to cards in the hot-card set.

14. A storage medium as defined in claim 13 wherein:

A) when the mutator modifies a reference, the mutator marks as modified the card to which that object belongs; and B) the remembered-set updating includes:
   i) scanning cards thus marked for references to objects in heap regions and recording such references' locations in the remembered sets associated with those heap regions; and
   ii) incrementing the count value for each card thus scanned.

15. A storage medium as defined in claim 14 wherein the count value is reset to zero when at least some collection increments occur.

16. A storage medium as defined in claim 13 wherein the hot-card set's size is limited to a predetermined maximum set size.

17. A storage medium as defined in claim 16 wherein a card becomes a member of the hot-card set whenever its count value reaches a predetermined threshold count value if the hot-card set's size has not reached the predetermined set size.

18. A storage medium as defined in claim 17 wherein, when the hot-card set's size has reached the predetermined set size and a card's count value reaches a predetermined threshold count value, that card becomes a member of the hot-card set and another card is removed from the hot-card set.

* * * * *